US005157424A

United States Patent [19]

Craven et al.

[11] Patent Number: 5,157,424

[45] Date of Patent: Oct. 20, 1992

[54] METHOD AND APPARATUS FOR MANUFACTURING TAMPER-RESISTANT IDENTIFICATION CARDS

[75] Inventors: Jack Craven; Robert Bilderback, both of Fort Wayne, Ind.

[73] Assignee: NBS Imaging Systems, Inc., Fort Wayne, Ind.

[21] Appl. No.: 582,362

[22] Filed: Sep. 14, 1990

[51] Int. Cl.[5] ........................ G01D 15/14; G01D 9/00

[52] U.S. Cl. ........................ 346/160; 346/11; 346/135.1

[58] Field of Search ........................ 346/160, 135.1, 1.1

[56] References Cited

U.S. PATENT DOCUMENTS

| | | | |
|---|---|---|---|
| 4,083,635 | 4/1978 | Reed, Jr. | 346/107 C |
| 4,467,335 | 8/1984 | Schmidt et al. | 346/160 |
| 4,675,746 | 6/1987 | Tetrick et al. | 346/160 X |
| 4,687,526 | 8/1987 | Wilfert | 156/64 |
| 4,737,859 | 4/1988 | Van Daele | 358/296 |

*Primary Examiner*—George H. Miller, Jr.

*Attorney, Agent, or Firm*—Burns, Doane, Swecker & Mathis

[57] ABSTRACT

An identification card for an individual contains textual data regarding the individual, a reproduction of the individual's signature and a photograph of the individual. The photograph has superimposed thereon a duplicate of the individual's signature as it appears elsewhere on the card. Through this modification of the photograph on the card with information that appears elsewhere, an unauthorized user is inhibited from tampering with the card by substituting one photograph for another.

8 Claims, 1 Drawing Sheet

FIG. 1
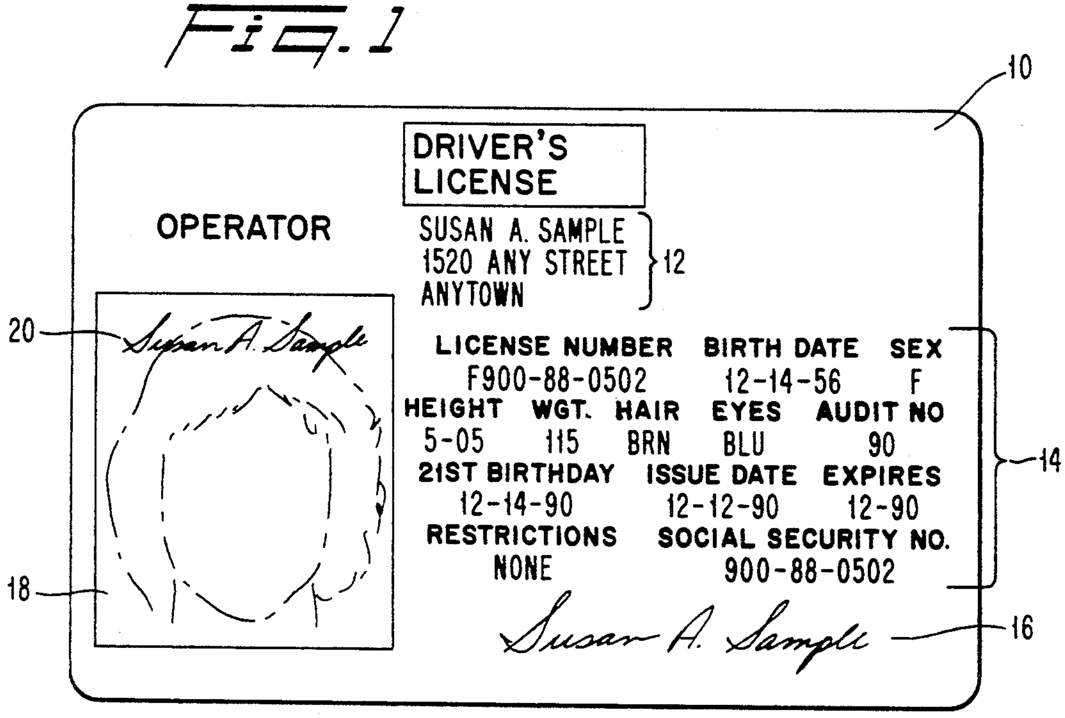
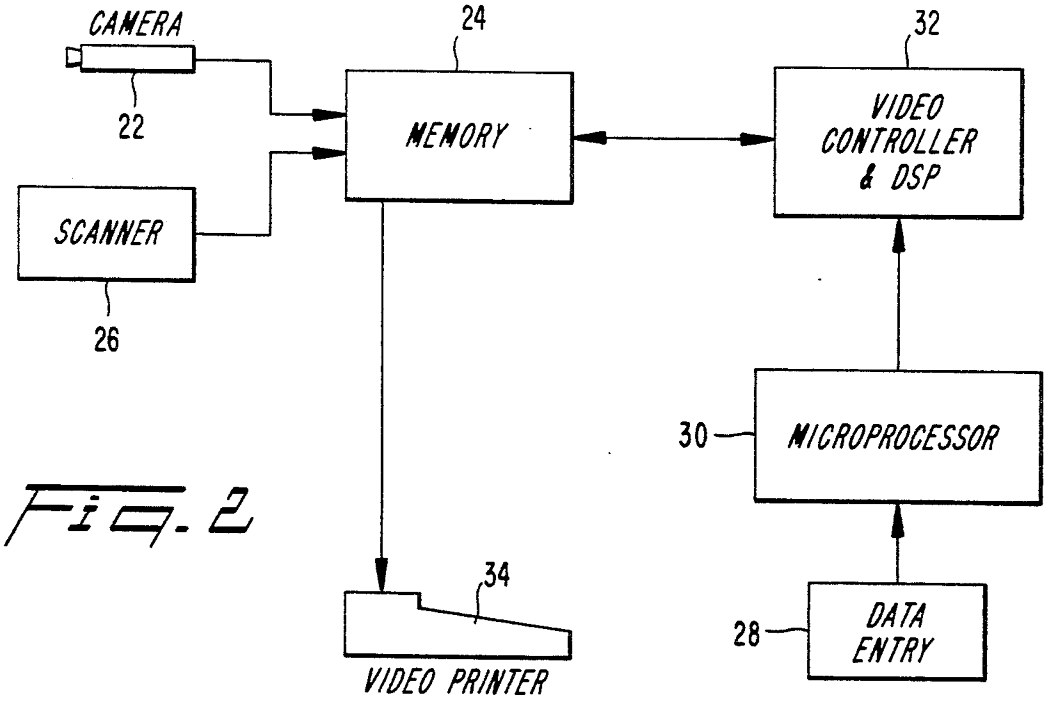
FIG. 2

METHOD AND APPARATUS FOR MANUFACTURING TAMPER-RESISTANT IDENTIFICATION CARDS

BACKGROUND OF THE INVENTION

The present invention is directed to the manufacture of identification cards for individual persons, such as drivers' licenses, credit cards, and the like. In particular, the present invention is concerned with the need to make such cards tamper-resistant, to prevent unauthorized use of an identification card by a person other than the person to whom the card pertains.

A relatively simple type of identification card for an individual typically contains textual data pertaining to the individual, such as name, address and date of birth, along with some type of identification number such as a driver's license number. In addition, the card may contain information regarding the physical attributes of the person, such as hair color, eye color, height and weight. Often, the card will also carry the person's signature. Unfortunately, it is quite difficult to prevent unauthorized use of this type of identification card by anyone who matches the general physical characteristics of the person described on the card. One approach to prevent unauthorized use is to require the person presenting the card to sign a piece of paper, and determine whether the signature matches that appearing on the card. However, with a little bit of practice an unauthorized user can learn to reproduce the signature on the card to an acceptable level, and thereby defeat efforts to prevent improper use.

As a further means to deter unauthorized use, more sophisticated identification cards include a picture of the person to whom they pertain. For example, it is quite common for most drivers' licenses to include a picture of the licensed driver thereon. This additional information on the card makes it significantly more difficult for the card to be readily used by a person other than the one to whom it pertains.

While offering a greater degree of security, identification cards which contain photographs are not foolproof. More particularly, these types of cards have been modified by removing the original photograph of the person to whom the card pertains and substituting a photograph of the unauthorized user. Unless a person to whom the card is presented personally knows the original cardholder, he is not apprised of the fact that the textual data and signature on the card do not pertain to the person whose photograph appears on the card.

In areas where security is a significant concern, highly sophisticated methods are employed to produce identification cards that are substantially tamper proof. For example, the cards may contain elements which are difficult to replicate, such as holograms, and/or they may be constructed of materials which are destroyed upon any attempt to tamper with the structure of the card. While these approaches may be feasible where areas of security is a high priority, their associated costs render them unsuitable for use in identification cards which are carried by a large segment of the population, such as drivers' licenses and credit cards.

It is therefore desirable to provide an inexpensive yet reliable approach to the manufacture of identification cards which renders the cards substantially tamper-resistant.

BRIEF STATEMENT OF THE INVENTION

In accordance with the present invention, an identification card can be made tamper-resistant in an inexpensive manner by reproducing information contained on one part of the card in a photograph which appears on another part of the card. Typically, the card contains a reproduction of the cardholder's signature. In a preferred embodiment of the invention, a duplicate of this signature is superimposed on the photograph of the cardholder appearing on the card.

By modifying the photograph on the card with information that appears elsewhere on the card, an unauthorized user is inhibited from tampering with the card by substituting one photograph for another. More particularly, it is not possible to simply remove the modified original photograph from the card and replace it with the unauthorized user's photograph. Since the original photograph has superimposed thereon the cardholder's signature, any substitute photograph would also have to contain a duplicate of the signature appearing elsewhere on the card if it is to be accepted as valid. Although it may be possible to modify a photograph with a likeness of a signature, it is very difficult to reproduce a precise duplicate of the signature elsewhere on the card. Thus, an unauthorized user's ability to tamper with the card is substantially reduced.

Further features of the invention and the advantages achieved thereby are described in detail hereinafter with reference to a preferred embodiment of the invention illustrated in the accompanying drawings.

BRIEF DESCRIPTION OF THE DRAWINGS

FIG. 1 is an illustration of a driver's license that is produced in accordance with the principles of the present invention; and FIG. 2 is a block diagram of a system for producing identification cards in accordance with the present invention.

DESCRIPTION OF THE ILLUSTRATED EMBODIMENTS

In the following description, reference is made to the implementation of the principles of the present invention in the manufacture of a driver's license. However, it will be appreciated that the applications of the invention are not limited thereto. Rather, the principles of the invention can be applied to any type of identification card, such as a credit card, in which it is desired to inhibit unauthorized use by tampering with information contained on the card.

Referring to FIG. 1, a driver's license which incorporates the principles of the present invention is illustrated. The license contains various types of information that are printed on a substrate 10. The substrate can be photographic paper or thermally printed material, for example, that is laminated or mounted on a suitable backing for support. The information contained on the license includes the name and address 12 of the operator, and data 14 regarding the physical characteristics and other identifying information pertaining to the operator. Also located on the license, below this identifying information 12, 14, is a reproduction of the operator's signature 16. Finally, the license includes a photograph 18 of the operator.

In accordance with the present invention, the photograph has superimposed thereon a reproduction 20 of the operator's signature. This reproduction 20 is a precise duplicate of the signature 16 appearing at the bottom of the license, except that it may be reduced in size and its color may be inverted to contrast with the background of the photograph. By providing identical reproductions of the same signature at two different locations on the license, any authority to whom the license is presented can readily determine whether the photograph is the one that properly belongs to the license.

More particularly, if an unauthorized user attempts to modify the license by substituting the user's photograph for that of the licensed operator, the photograph is immediately recognized as being invalid due to the lack of a signature thereon. Although the unauthorized user might attempt to get around this safeguard by writing a signature on the improper photograph, such an attempt is inhibited by the fact that the signature must be a duplicate of the other signature 16 appearing on the license. In other words, a reasonable likelihood would not suffice, since the authority to whom the license is presented should be able to recognize whether the two signatures are duplicates of one another.

It is, of course, possible to use other information appearing on the license in place of the signature 20. For example, any of the textual data 12 or 14 could be superimposed over the photograph. However, the use of this textual data is not as preferable as the use of a signature, because it is easier to duplicate with standard equipment such as printers or typewriters. In contrast, each written signature is individual to the person, with its characteristic slant and loops, for example, and therefore much more difficult to precisely duplicate on a photograph.

A system for producing drivers' licenses of the type shown in FIG. 1 is illustrated in block diagram form in FIG. 2. Referring thereto, the system includes a camera 22, preferably a color camera, for capturing a portrait of the licensed operator. In the preferred embodiment of the invention, the camera 22 is an electronic camera, which generates a digital signal representative of the image captured thereby. This digital signal is provided to a memory 24.

Alternatively, it is possible to use a photographic camera, and subsequently digitize the photograph provided thereby to generate the digital information that is stored in the memory 24.

The system also includes a scanner 26 for capturing an image of the operator's signature. In operation, the operator signs a card that is placed in the scanner. The scanner generates a digital signal representative of an image of that signature. For example, the scanner can be a black and white electronic camera, or any other suitable mechanism for digitizing a black and white image. The digital information from the scanner 26 regarding the operator's signature is also stored in the memory 24.

The additional information 12, 14 provided on the card is entered through means of a suitable data entry mechanism 28, and stored at an appropriate location in the memory by means of a microprocessor 30. In practice, the microprocessor can be embodied within a suitable personal computer, such as one based upon the Intel 80386 microprocessor chip. In this case, the data entry mechanism 28 would comprise the keyboard for the personal computer.

The signature information stored within the memory 24 is transferred to a video controller and digital signal processor 32. This controller checks the threshold of the signature data, i.e. determines whether each pixel in the image of the signature is to be represented as a black pixel or a white pixel. The controller and digital signal processor also reduces the size of the image presented by the data so that it will fit within the confines of the portrait 20. This information is then inverted and sent back to the memory 24, where it is combined with the portrait information from the camera 22 to effectively place a contrasting reproduction of the signature in the portrait.

The information stored within the memory 24 regarding the textual data 12 and 14, the image of the licensed operator's signature 16, and the modified portrait of the operator, is provided to a video printer 34 which prints this information at the appropriate locations to produce a card such as that illustrated in FIG. 1. The video printer can be a thermal video printer, which is controlled by either the video controller 32 or the microprocessor 30. Furthermore, although the memory 24 is illustrated as a separate unit in the block diagram of FIG. 2, this memory can be embodied within the internal memory of the printer 34.

It will be appreciated by those of ordinary skill in the art that the present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. Apparatus for manufacturing a tamper-resistant identification card for an individual person, comprising:
- means for digitizing a pictorial image of the person to whom the card pertains;
- means for digitizing an image of the signature of the person to whom the card pertains;
- means for combining the digitized pictorial image and the digitized signature to create a composite image containing a picture of the person with the signature superimposed thereon; and
- a printer for printing said composite image at a first location on a card and said signature at a second location on the card so that the same signature appears at two separate locations on the card.

2. A method for manufacturing a tamper-resistant identification card, comprising:
- generating and storing a digitized image of the person to whom the card pertains;
- digitizing and storing an image of the signature of the person to whom the card pertains;
- creating a composite image comprising the stored image of the person having the stored image of the signature superimposed thereon;
- printing the composite image at a first location on a card; and
- printing the stored image of the signature at a second location on the card so that the card contains two reproductions of the same signature at two separate locations thereon.

3. Apparatus for manufacturing a tamper-resistant identification card for an individual person, comprising:
- means for digitizing a pictorial image of the person to whom the card pertains;
- means for entering information pertaining to the person to whom the card pertains;
- means for creating a composite image containing a picture of the person with at least a portion of said information superimposed thereon; and a printer for printing said composite image at a first location on a card and said information at a second location on the card so that the same portion of the information appears at two separate locations on the card.

4. The apparatus of claim 3 wherein said portion of the information is non-textual in nature.

5. The apparatus of claim 4 wherein said portion of the information includes an image of a signature of the person to whom the card pertains.

6. A method for manufacturing a tamper-resistant identification card, comprising:

generating and storing a digitized image of the person to whom the card pertains;

storing information pertaining to the person to whom the card pertains;

modifying the stored image by superimposing thereon at least a portion of the stored information;

printing the modified image at a first location on a card; and printing the stored information at a second location on the card so that the card contains the same portion of the information at two separate locations thereon.

7. The method of claim 6 wherein said portion of the information is non-textual in nature.

8. The method of claim 7 wherein said portion of the information includes an image of a signature of the person to whom the card pertains.

* * * * *